Sept. 22, 1959     F. KOPPELMANN     2,905,882
CONVERTER
Filed Aug. 19, 1958     2 Sheets-Sheet 1
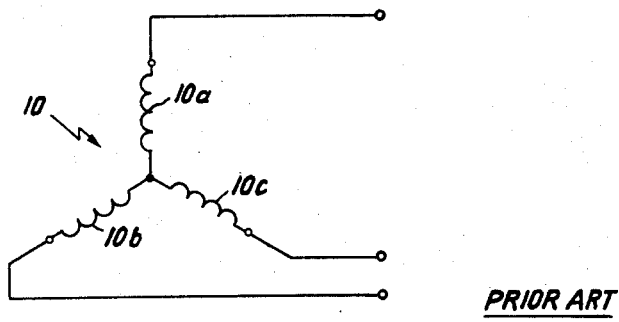
*Fig.1*     PRIOR ART
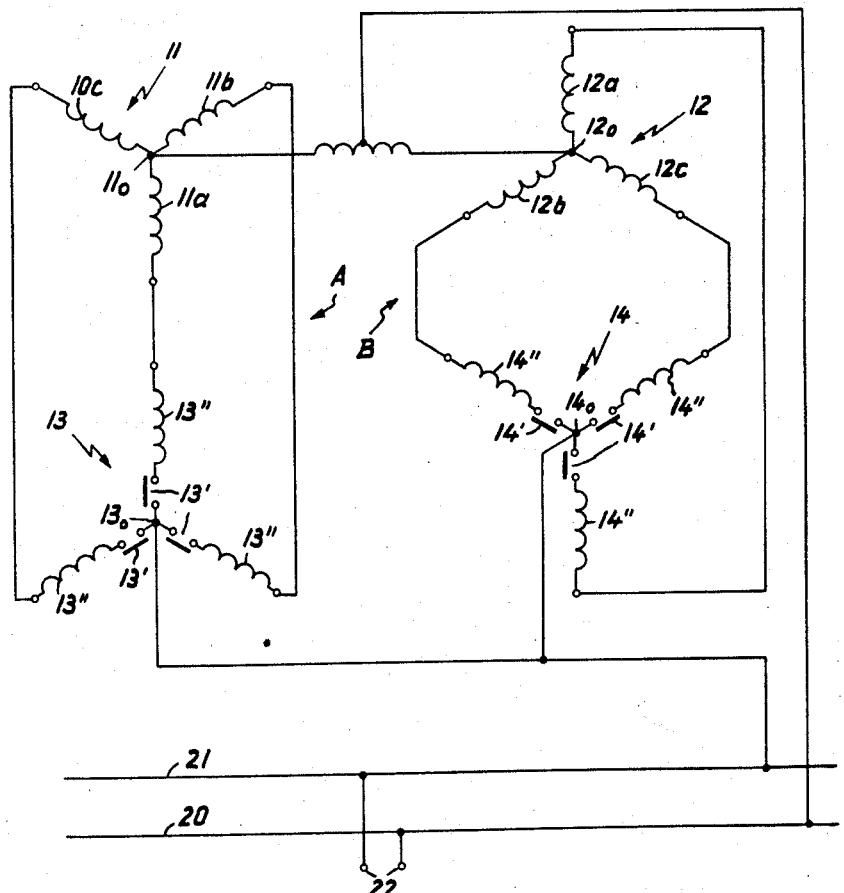
Inventor:
FLORIS KOPPELMANN
BY Toulmin & Toulmin
ATTORNEYS Sept. 22, 1959 F. KOPPELMANN 2,905,882
CONVERTER
Filed Aug. 19, 1958 2 Sheets-Sheet 2
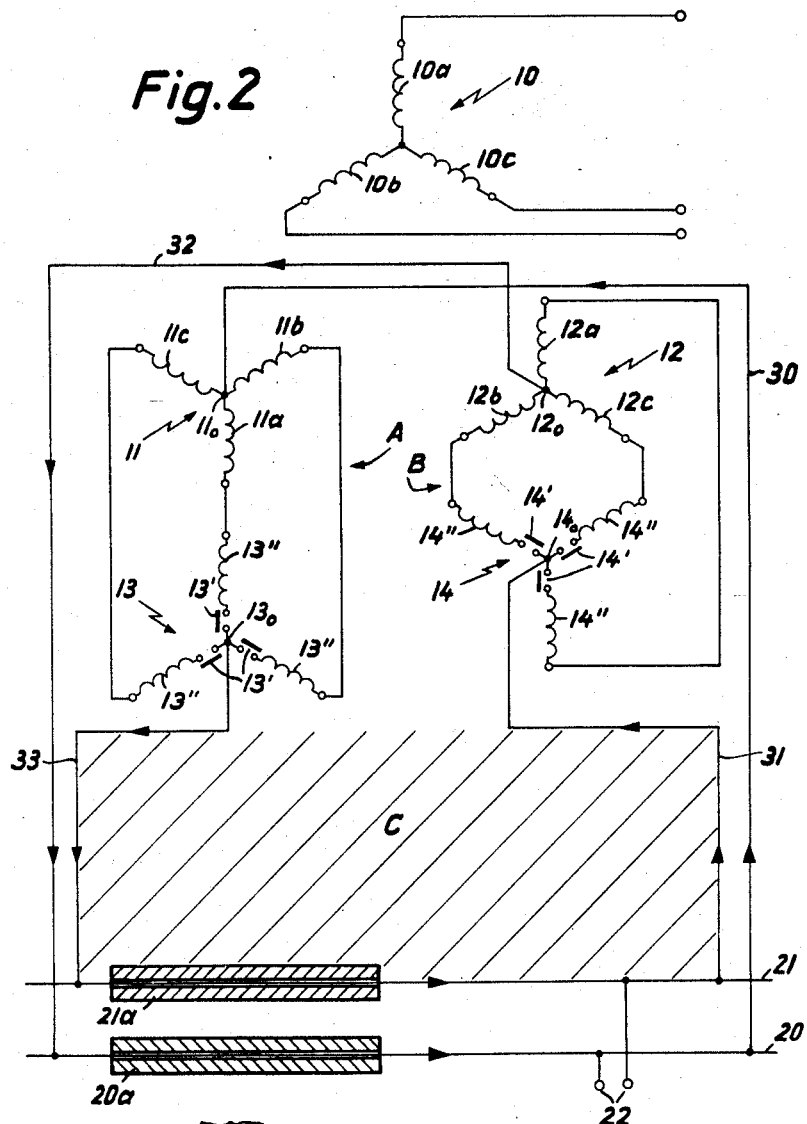
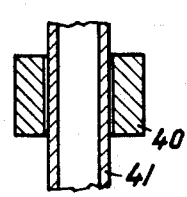
Inventor:
FLORIS KOPPELMANN
BY Toulmin & Toulmin
ATTORNEYS

United States Patent Office 2,905,882
Patented Sept. 22, 1959

2,905,882

CONVERTER

Floris Koppelmann, Berlin, Germany, assignor to Licentia Patent-Verwaltungs-G.m.b.H., Hamburg, Germany Application August 19, 1958, Serial No. 756,030

Claims priority, application Germany August 20, 1957

14 Claims. (Cl. 321—27)

The present invention relates to a six-phase, double-Y connected converter which is capable of rectifying A.C. or of converting D.C. to A.C.

It is known that in a transformer having two sets of Y-connected secondaries, the phases of which are shifted with respect to each other, i.e., in a Y-connected transformer, third and higher harmonics will appear. These currents have heretofore been prevented through the use of an interphase transformer. This transformer, however, in addition to being expensive, reduces the efficiency of the converter. Furthermore, the iron core of the interphase transformer is saturated as soon as the currents through the two sets of Y-connected secondaries are not exactly equal to each other.

It is therefore an object of the present invention to overcome the above disadvantages, and, with this object in view, the present invention consists mainly in a six-phase converter arrangement comprising (a) two sets of converting circuits each having two Y-connected circuit components the individual branches of which are connected to each other and (b) means connecting these sets of converting circuits in parallel with each other, wherein these means form a coil which has at least two turns and has an inductance sufficiently high to suppress and substantially to prevent the flow of an equalizing current containing third and higher harmonics.

Additional objects and advantages of the present invention will become apparent upon consideration of the following description when read in conjunction with the drawing wherein:

Fig. 1 represents the prior art in that it shows a circuit diagram of a six-phase connection in which an interphase transformer is used;

Fig. 2 is a circuit diagram of a six-phase connection according to the present invention; and Fig. 3 is a diagrammatic sectional view of a saturable reactor incorporated in the circuit of Fig. 2.

Referring now to the drawing, and to Fig. 1 thereof in particular, there is shown a conventional converter incorporating a Y-connected transformer having a primary 10 and split secondaries 11 and 12. The windings 10a, 10b and 10c of the primary 10 are connected to a suitable three-phase power supply (not shown), and the corresponding split secondary windings 11a—12a, 11b—12b and 11c—12c are reversed so as to give a six-phase relationship.

The converter includes two sets of converting circuits A and B each of which sets includes two Y-connected circuit components the individual branches of which are connected to each other. As is shown in Fig. 1, one of the Y-connected circuit components of converting circuit A is the secondary 11 and the other is a Y-connected current-controlling component in the form of a switching circuit 13 each branch of which incorporates a periodically actuated switch 13′ and a saturable choke or switching reactor 13″. Similarly, the converting circuit B incorporates as one of its Y-connected circuit components the secondary 12, and a Y-connected current-controlling component in the form of a switching circuit 14 each branch of which includes a periodically actuated switch 14′ and a saturable choke or switching reactor 14″. The respective branches of the components of each converting circuit are connected to each other.

The neutrals $11_0$ and $12_0$ of the secondaries 11 and 12 are connected to each other by way of an interphase transformer 15, the center tap $15_0$ of which is connected to a bus bar 20, and the other neutrals $13_0$ and $14_0$ are connected to the other bus bar 21 so that the circuits A and B are in parallel with each other. A suitable load is connected across the bus bars at 22. As set forth above, it is the purpose of the interphase transformer 15 to suppress the flow of equalizing current containing third and higher harmonics.

The converter may be operated as a rectifier by opening and closing the switches 13′, 14′ in synchronism with the current from the power supply connected to the primary, so that a direct current will be supplied to the load at 22. Alternatively, a direct current source may be connected across the bus bars 20, 21 and the converter may be operated in the manner of an inverted converter by appropriate opening and closing of the switches 13′, 14′.

The above-described arrangement constitutes the known art, and has been included herein to facilitate an understanding of the present invention which consists, essentially, in a converter arrangement similar to the one shown in Fig. 1, except that the suppression of third and higher harmonics is achieved without the use of an interphase transformer. Thus, Fig. 2 shows a converter arrangement according to the present invention, and since this converter incorporates the same basic elements as the converter of Fig. 1, with the exception of the interphase transformer 15, the same reference numerals have been used to indicate the various circuit elements.

According to the present invention, as shown in Fig. 2, third and higher harmonics are suppressed by so arranging the means which connected the circuits A and B in parallel with each other that the connecting means form a coil which has at least two turns and has an inductance sufficiently high to suppress, and substantially to prevent, the flow of currents containing third and higher harmonics. This is achieved by running the lead 30 which connects the neutral $11_0$ to the bus bar 21 and the lead 31 which connects the neutral $14_0$ to the bus bar 21 in such a manner that the two leads 30 and 31 are co-extensive throughout at least a portion of their lengths, and by running the lead 32 which connects the neutral $12_0$ to the bus bar 20 and the lead 33 which connects the neutral $13_0$ to the bus bar 21 in such a manner that the two leads 32 and 33 are co-extensive throughout at least a portion of their lengths. In this way, the leads 30, 31, 32, 33, together with a portion of the length of the bus bars 20, 21 form a connecting means connecting the circuits A and B in parallel with each other, which connecting means form a coil or loop of at least two turns. An equalizing current which tends to flow between the circuits A and B must thus flow through both of these turns, as shown by the arrows. Inasmuch as the inductance of a coil varies as the square of the number of turns, the two-turn loop according to the present invention has four times the inductance which a one-turn loop of similar dimension would have. At the same time, the lead arrangement in a converter according to the present invention is suitable for easy installation; furthermore, the high inductance of the loop is achieved without the use of excessive material.

In practice, the area C encompassed by the loop and shown in Fig. 2 by diagonal lines, may readily be of such dimension as to be equivalent to a circle of 5 meters diameter. The inductance of a one-turn loop of such size may be computed to be approximately $10 \times 10^{-6}$ H, whereas the inductance of a two-turn loop of similar size is four times as great, or $40 \times 10^{-6}$ H. With an air inductance of this order of magnitude, the equalizing current of a high-amperage converter can be kept to a fraction of the rated current, provided the voltage is not too high. Under such conditions, the interphase transformer may be dispensed with, while under other conditions in which it is desirable to retain the interphase transformer, the lead arrangement according to the present invention may still be incorporated so as to suppress the equalizing current at such times as an uneven load is placed on the circuits and the interphase transformer becomes saturated.

If for structural reasons the area C cannot be made sufficiently large, the inductance of the two-turn loop can be increased artificially by surrounding the bus bars 20, 21 with ferromagnetic sheaths 20a, 21a, which act as single-turn ring windings.

Fig. 3 diagrammatically shows a saturable switch reactor of the type incorporated in the switch circuits 13, 14, when the converter is used for high-amperage current. In that case the reactors may be in the form of single-turn ring winding 40 which encompasses a hollow tubular conductor 41 through which a suitable coolant may be circulated. The ring winding 40 is made of a ferromagnetic material such as ferronickel or ferrosilicon, the latter being somewhat more desirable in that the increased magnetization which is possible even above the saturation bend makes it possible for the reactor to take over the function of the interphase transformer at relatively low currents, under which circumstances the lead arrangement according to the present invention is not yet fully effective.

The present invention is of particular importance in converters using mechanical switches or interrupters equipped with switching reactors, such as the arrangement shown in Fig. 2. In such arrangement, the direct voltages are relatively low, so that the inductivity of the bus bars has considerable influence. At low current, the switching reactors prevent the flow of three-phase rotary current. At high current the converter would operate in the manner of a six-pulse switching circuit with each pulse lasting 60 electrical degrees, were not the equalizing current of the third harmonic limited, according to the present invention, to but a fraction of the rated direct current. The fact that, according to the present invention, third harmonics are not entirely suppressed has the advantage that in mechanical rectifiers the phase current does not, at the beginning of each commutation, assume the full direct current valve, i.e., full direct current value of a single phase, but a lower instantaneous value, whereby the duration of commutation and, consequently, the change of commutation time under load are decreased. The latter is of especial importance in the case of mechanical converters, inasmuch as in such converters the overlapping between the instants of closing of the various switches cannot readily be adapted to the duration of the electrical commutation. The present invention, however, makes it possible to use mechanical circuit interrupters the period of which cannot be adjusted, since the duration of commutation varies but little with the load current. This invention is particularly advantageous when used in mechanical converters equipped with by-passes or shunt circuits of high absorption capacity, such as germanium or silicon rectifier cells, since in this case a large part of the commutation can be effected by the cells without these cells being called upon to conduct the full load current even transitorily.

Furthermore, the present invention finds application in a rectifier which incorporates in its current-controlling component high performance semi-conductor blocking layer rectifier cells such as germanium or silicon cells, rather than mechanical interrupters, when such rectifiers incorporate in each branch saturable reactors which control or delay the rise of the voltage. For such blocking layer rectifier cells, it is advantageous if shortly before the impression of the blocking voltage the current is not too high, i.e., it is advantageous if the rate of current decrease shortly before the application of the blocking voltage is not too great. According to the present invention, this result is achieved if the third harmonic is not completely suppressed.

The present invention is of particular interest in the case of medium-voltage, high-amperage converters, as, for example, 200 v. and upward of 10,000 a. Converters of such orders of magnitude find use in large electrolyzer installations such as chlorine electrolyzers or the like.

It will be understood that the present invention is susceptible to modification in order to adapt it to different usages and conditions, and, accordingly, it is desired to comprehend such modifications within this invention as may fall within the scope of the appended claims.

What I claim is:

1. In a six-phase converter arrangement comprising (a) two sets of converting circuits each having two Y-connected circuit components the respective branches of which components are connected to each other and (b) connecting means connecting said sets of converting circuits in parallel with each other, the improvement that said connecting means form a coil which has at least two turns and has an inductance sufficiently high to suppress the flow of an equalizing current containing third and higher harmonics.

2. In a six-phase converter arrangement, in combination, two sets of converting circuits each having two Y-connected circuit components the respective branches of which are connected to each other; and connecting means connecting said sets of converting circuits in parallel with each other, said connecting means forming a two-turn coil having an inductance sufficiently high to suppress the flow of an equalizing current containing third and higher harmonics, whereby an interphase transformer between said sets of converting circuits may be dispensed with.

3. In a six-phase converter arrangement, in combination, two sets of converting circuits each having a Y-connected transformer component and a Y-connected current-controlling component the respective branches of which components are connected to each other; and connecting means connecting said sets of converting circuits in parallel with each other, said connecting means forming a two-turn coil having an inductance sufficiently high to suppress the flow of an equalizing current containing third and higher harmonics, whereby an interphase transformer between said sets of converting circuits may be dispensed with.

4. In a six-phase converter arrangement, in combination, two sets of converting circuits each having a Y-connected transformer component and a Y-connected current-controlling component the respective branches of which components are connected to each other, each branch of said current-controlling component including a periodic mechanical interrupter; and connecting means connecting said sets of converting circuits in parallel with each other, said connecting means forming a two-turn coil having an inductance sufficiently high to suppress the flow of an equalizing current containing third and higher harmonics, whereby an interphase transformer between said sets of converting circuits may be dispensed with.

5. In a six-phase converter arrangement, in combination, two sets of converting circuits each having a Y-connected transformer component and a Y-connected current-controlling component the respective branches of which components are connected to each other, each branch of said current-controlling component including a periodic mechanical interrupter and a switching reactor; and connecting means connecting said sets of converting circuits in parallel with each other, said connecting means forming a two-turn coil having an inductance sufficiently high to suppress the flow of an equalizing current containing third and higher harmonics, whereby an interphase transformer between said sets of converting circuits may be dispensed with.

6. In a six-phase converter arrangement, in combination, two sets of converting circuits each having a Y-connected transformer component and a Y-connected current-controlling component the respective branches of which components are connected to each other, each branch of said current-controlling component including rectifier means; and connecting means connecting said sets of converting circuits in parallel with each other, said connecting means forming a two-turn coil having an inductance sufficiently high to suppress the flow of an equalizing current containing third and higher harmonics, whereby an interphase transformer between said sets of converting circuits may be dispensed with.

7. In a six-phase converter arrangement, in combination, two sets of converting circuits each having a Y-connected transformer component and a Y-connected current-controlling component the respective branches of which components are connected to each other, each branch of said current-controlling component including semi-conductor rectifier means; and connecting means connecting said sets of converting circuits in parallel with each other, said connecting means forming a two-turn coil having an inductance sufficiently high to suppress the flow of an equalizing current containing third and higher harmonics, whereby an interphase transformer between said sets of converting circuits may be dispensed with.

8. In a six-phase converter arrangement, in combination, two sets of converting circuits each having a Y-connected transformer component and a Y-connected current-controlling component the respective branches of which components are connected to each other; and four connecting means connected to the neutrals of said components, respectively, the two connecting means which are connected to the neutrals of said transformer components being connected to each other and the two connecting means which are connected to the neutrals of said current-controlling components being connected to each other with the connecting means which is connected to the transformer component of one of said sets and the connecting means which is connected to the current-controlling component of the other of said sets being coextensive throughout at least a portion of their lengths and the connecting means which is connected to the transformer component of said other set and the connecting means which is connected to the current-controlling component of said one set being coextensive throughout at least a portion of their lengths, said four connecting means thus forming a two-turn coil through which any equalizing current between said sets of converting circuits must flow.

9. The combination defined in claim 8 wherein said connecting means are so arranged that said two-turn coil has an inductance sufficiently high to suppress the flow of currents containing third and higher harmonics.

10. The combination defined in claim 9 wherein said two-turn coil encompasses an area equivalent to a circle of approximately 5 meters.

11. The combination defined in claim 9 wherein the inductance of said two-turn coil is increased by ring windings in the form of ferromagnetic sheathing means encompassing at least part of said connecting means.

12. In a six-phase converter arrangement, in combination, two sets of converting circuits each having a Y-connected transformer component and a Y-connected current-controlling component the respective branches of which components are connected to each other; a pair of bus bars; and a first lead connecting the neutral of the transformer component of one of said sets to one of said bus bars; a second lead connecting the neutral of the current-controlling component of the other of said sets to the other of said bus bars, said first and second leads being co-extensive throughout at least a portion of their lengths; a third lead connecting the neutral of the transformer component of said other set to said one bus bar; and a fourth lead connecting the neutral of the current-controlling component of said one set to said other bus bar, said third and fourth leads being coextensive throughout at least a portion of their lengths, said leads and bus bars thus forming a two-turn coil through which any equalizing current between said sets of converting circuits must flow.

13. The combination defined in claim 12 wherein said leads and bus bars are so arranged that said two-turn coil has an inductance sufficiently high to suppress the flow of currents containing third and higher harmonics.

14. The combination defined in claim 13 wherein the inductance of said two-turn coil is increased by ring windings in the form of ferromagnetic sheathing means encompassing at least part of the conductors constituting said coil.

References Cited in the file of this patent

UNITED STATES PATENTS

| 2,307,527 | Maslin et al. | Jan. 5, 1943 |
| 2,340,098 | Zuhlke | Jan. 25, 1944 |